(12) United States Patent
Gardner et al.

(10) Patent No.: US 11,484,024 B1
(45) Date of Patent: Nov. 1, 2022

(54) INSECT EGRESS DEVICE

(71) Applicants: Jonathan Gardner, High River (CA); James Chadney, High River (CA)

(72) Inventors: Jonathan Gardner, High River (CA); James Chadney, High River (CA)

( * ) Notice: Subject to any disclaimer, the term of this patent is extended or adjusted under 35 U.S.C. 154(b) by 0 days.

(21) Appl. No.: 17/319,517

(22) Filed: May 13, 2021

(51) Int. Cl.
| | | |
|---|---|---|
| *A01M 29/34* | (2011.01) | |
| *E06B 9/52* | (2006.01) | |
| *A01M 1/00* | (2006.01) | |

(52) U.S. Cl.
CPC .............. *A01M 29/34* (2013.01); *A01M 1/00* (2013.01); *E06B 9/52* (2013.01)

(58) Field of Classification Search
CPC ......... A01M 1/106; A01M 29/34; A01M 1/00
USPC .............................................. 160/16; 43/119
See application file for complete search history.

(56) References Cited

U.S. PATENT DOCUMENTS

| | | | | |
|---|---|---|---|---|
| 441,287 | A * | 11/1890 | Cox ................ | A01M 2200/012 43/119 |
| 1,046,902 | A * | 12/1912 | Tootell ..................... | E06B 9/52 160/16 |
| 1,081,369 | A * | 12/1913 | Critzer et al. ... | A01M 2200/011 43/119 |
| 1,120,046 | A * | 12/1914 | Fritsch ............ | A01M 2200/012 43/119 |
| 1,166,606 | A * | 1/1916 | Kromer ........... | A01M 2200/011 43/119 |
| 1,260,261 | A * | 3/1918 | Hembes ..................... | E06B 9/52 160/12 |
| 1,260,975 | A * | 3/1918 | Fulton .................... | A47F 5/0823 160/16 |
| 1,277,301 | A * | 8/1918 | Feldman ......... | A01M 2200/012 43/119 |
| 1,294,184 | A * | 2/1919 | Stanley ............ | A01M 2200/011 43/119 |
| 1,334,099 | A | 3/1920 | Johnson | |
| 1,338,113 | A * | 4/1920 | Tibbetts .................. | A01M 1/24 43/119 |
| 1,566,032 | A * | 12/1925 | Martin .................. | A01M 1/106 43/119 |
| 1,800,108 | A | 4/1931 | Schmitz | |
| 1,951,289 | A | 3/1934 | Menze et al. | |
| 2,042,236 | A | 5/1936 | Moye | |
| 2,350,519 | A | 6/1944 | Olson | |

(Continued)

*Primary Examiner* — Brent W Herring
(74) *Attorney, Agent, or Firm* — Lewellyn Law, PLLC; Stephen Lewellyn

(57) ABSTRACT

An insect egress device for use with a window or door screen has a portal that is attached to the window screen with a portion of the portal extending through the screen from the inside to the outside. The portal may be provided with various insect attracting features and includes a flange, an extension extending outwardly from the flange surface that terminates at a free end, and an egress passage extending completely through the flange and the extension. The extension has a frusto-pyramidal shaped section and a second extension section that is generally straight and includes the free end. The egress passage has a first sidewall section of a tapering stair-step configuration and a second sidewall section that is not stair-step and is generally straight and terminates at the free end. In aspects, a phosphorescent material is disposed on the first sidewall section and visible through the egress passage from an interior position.

20 Claims, 5 Drawing Sheets

(56) References Cited

U.S. PATENT DOCUMENTS

| | | | | |
|---|---|---|---|---|
| 3,770,043 | A | * | 11/1973 | Buckner .................. E06B 9/52 160/16 |
| 4,044,494 | A | | 8/1977 | Grajnert |
| 5,231,792 | A | * | 8/1993 | Warner ................ A01M 1/106 43/122 |
| 8,051,600 | B2 | * | 11/2011 | Schneidmiller ....... A01M 1/106 43/133 |
| 2006/0048442 | A1 | | 3/2006 | Leming |
| 2008/0263938 | A1 | * | 10/2008 | Schneidmiller ....... A01M 1/106 43/122 |
| 2009/0151227 | A1 | * | 6/2009 | Schneidmiller ....... A01M 1/106 43/107 |
| 2020/0383309 | A1 | * | 12/2020 | Reckhaus ............. A01M 1/106 |

* cited by examiner

INSECT EGRESS DEVICE

FIELD OF THE INVENTION

The present disclosure relates to new and useful improvements in fly or insect egress devices for use particularly in connection with window and door screens to attract and encourage flies and insects to move through the device and escape a room.

BACKGROUND OF THE INVENTION

Insects, flying or otherwise, often get trapped inside an occupant space, whether the space is a room of a building, the inside of a tent, a recreation vehicle, or other enclosed space. The trapped insects are often an annoyance and/or a health risk to occupants of the space. Accordingly, there is a need and desire for a device that allows insects trapped inside a space to escape to the outdoors.

SUMMARY OF THE INVENTION

Embodiments of the invention provide an insect egress device that allows insects trapped within an inside space to escape to the outside. In aspects, the egress device is easily installed on a window or door screen, thereby allowing insects to escape to the outdoors through the screen. In aspects, the egress device has a simple construction, making installation and use easy for a user. In embodiments, the insect egress device is constructed in a manner to encourage insect attraction to the device and escape to the outdoors through the device.

An object of the invention is to provide an insect egress device that mitigates exposure to potentially harmful diseases and bacteria by providing an opportunity for insects trapped in an occupant space to escape the space.

Another object of the invention is to provide an insect egress device that helps maintain and repair the ecosystem by allowing flies and other insects the ability to fulfill their purpose and return to nature alive and unharmed.

Another object of the invention is to provide an insect egress device for use with a window or door screen or the like that can reinforce and/or repair existing rips, tears, and other screen damage.

Another object of the invention is to provide an insect egress device that is decorative, allowing for a variety of aesthetically pleasing yet functional surfaces to be chosen and positioned by a user.

Another object of the invention is to provide an insect egress device that exploits and utilizes chromatic and dichromatic functionality. Research indicates that chromatic and dichromatic attraction is the most effective way of attracting bugs and insects to an egress device, short of the use of artificial or non-artificial odor attractants. Flies can see polarized colors and are attracted to colors that sit in the ultraviolet spectrum.

Another object of the invention is to provide an insect egress device of a rigid two-piece construction allows for the device to be used on a variety of screens with varying levels of thickness and ensures that the inside-facing surface will maintain the closest possible proximity to the screen, allowing for an unimpeded transition from screen to device, thereby eliminating any potential for voids that may be present between screen and backside of device. A void may prevent a fly or insect from accessing device; a fly or insect may also crawl into void and be prevented from exiting.

Another object of the invention is to provide an insect egress device having an outer profile or shape that permits a user to select the placement of device and does not limit placement to only a corner of a screen.

Another object of the invention is to provide an insect egress device having an extension which provides a takeoff area, which entices insects to escape to the outside.

Another object of the invention is to provide an insect egress device that has multi-function colors, permitting the device to act as an aesthetically pleasing decoration, allowing a user to select from a variety of patterns that they may choose from and enjoy.

Another object of the invention is to provide an insect egress device that may be constructed from plastics, utilizing additives to reduce UV damage, reduce
corrosion and mildew susceptibility and not include any metal to eliminate rust damage to screen and surrounding surfaces.

In general, in one aspect, an insect egress device is provided. The insect egress device is configured for use with a screen to permit insects trapped inside to escape through the egress device to the outdoors. The egress device has a portal with a planar flange having opposite first and second broad flange surfaces, an extension extending outwardly from the second broad flange surface and terminating at a free end, and an egress passage extending completely through the flange and the extension. The extension has first and second extension sections.

The first extension section is frusto-pyramidal shaped and tapers from wide to narrow in a direction outwardly from the second broad flange surface toward the second extension section. The first extension section, at its narrow end, transitions into the second extension section which includes the free end. The egress passage has first and second sidewall sections. The first sidewall section has a tapering stair-step configuration that tapers from wide to narrow in a direction away from the second broad flange surface and the free end. The first sidewall section transitions into the second sidewall section that is not stair-step and is generally straight and terminates at the free end.

The egress device may further have a pressure-sensitive adhesive on the second broad flange surface. The egress device may further have a phosphorescent material disposed on the first sidewall section and visible through the egress passage from an interior position located on the first broad flange surface side of the portal. Further, the egress device may have a retainer having opposite first and second broad retainer surfaces and an aperture extending therethrough, the aperture sized in such a way that the extension can be passed therethrough and join to the second broad retainer surface adjacent to the second broad flange surface. A pressure-sensitive adhesive may be provided on the second broad retainer surface.

Further yet, the egress device may have bristles disposed in the egress passage and around the passage and approximate the transition from the first sidewall section and the second sidewall section. The bristles are tapered inwardly into the egress passage in and in a direction toward the free end to allow passage of an insect through the bristles in a direction from the flange toward the free end and prevent the passage of an insect in the opposite direction. The bristles may be comprised partially or entirely of a low-visibility material.

The egress device may also have a decorative pattern disposed on the first broad flange surface and the decorative pattern may include simulative water droplets. The egress device may also be provided such that at least the extension is colored
in a dark color to absorb thermal energy from sunlight and to be heated by the absorbed thermal energy.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
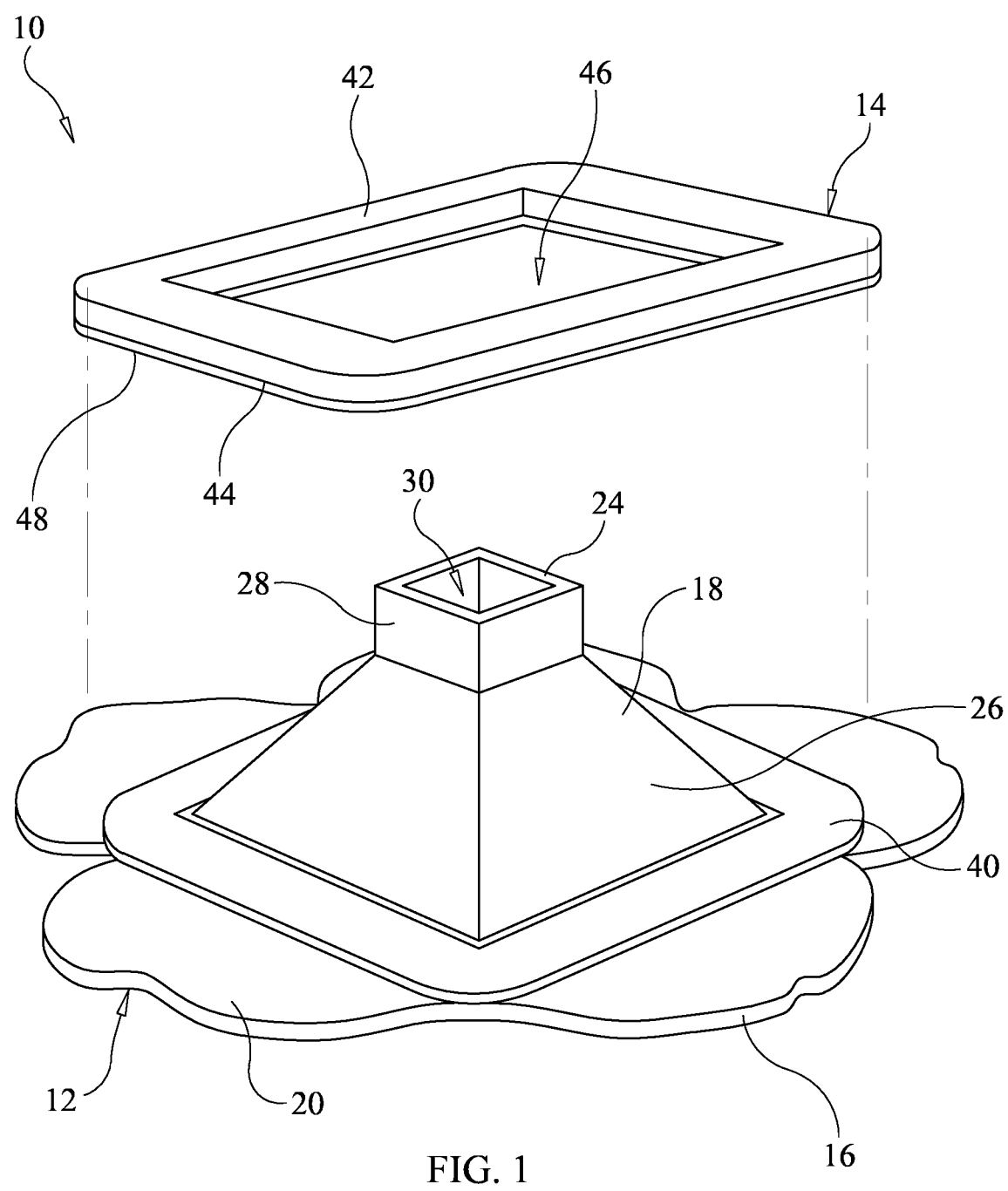
FIG. 1 is a diagrammatic, exploded perspective view of an insect egress device constructed in accordance with the principles of at least one embodiment of the invention.
Figure 2:
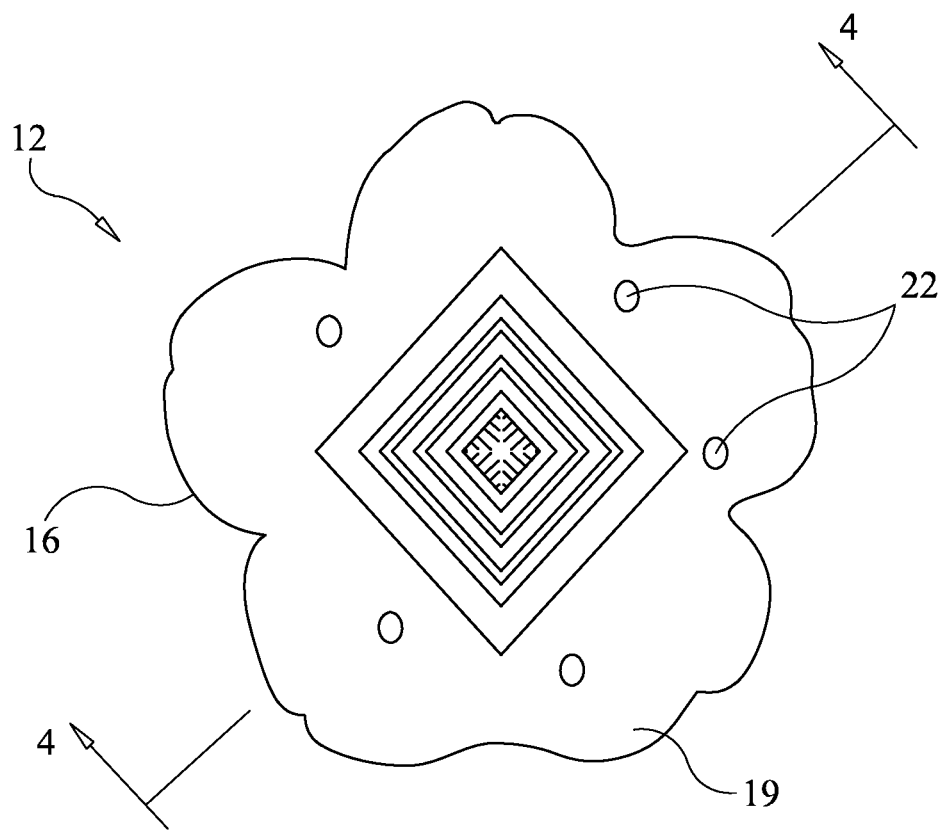
FIG. 2 is a diagrammatic, front view of an insect egress device constructed in accordance with the principles of at least one embodiment of the invention.
Figure 3:
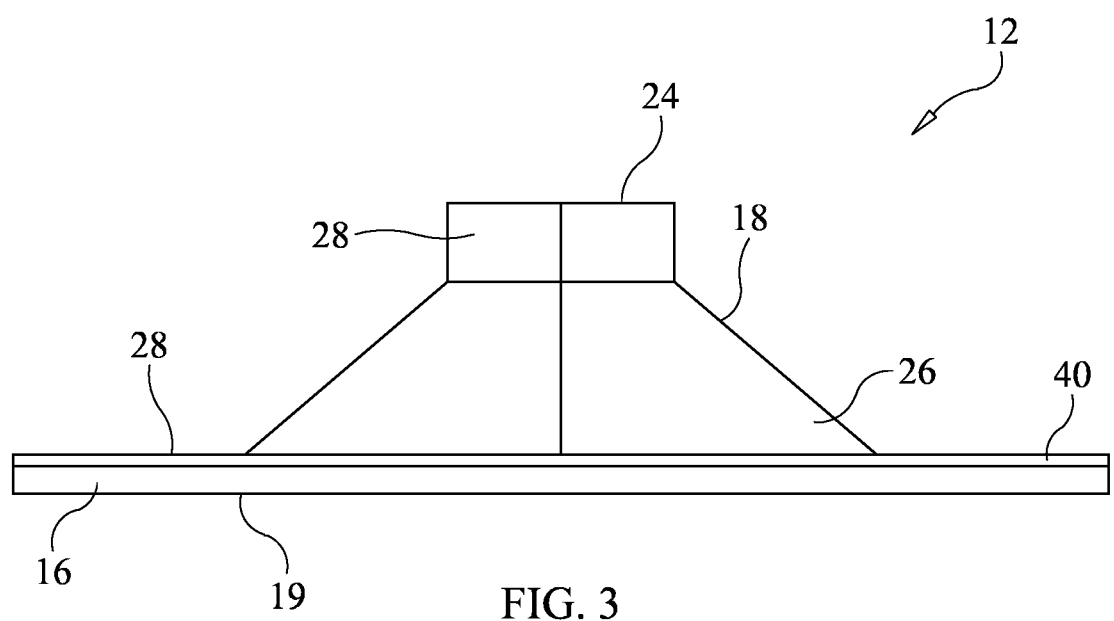
FIG. 3 is a diagrammatic, side view of an insect egress device constructed in accordance with the principles of at least one embodiment of the invention.
Figure 4:
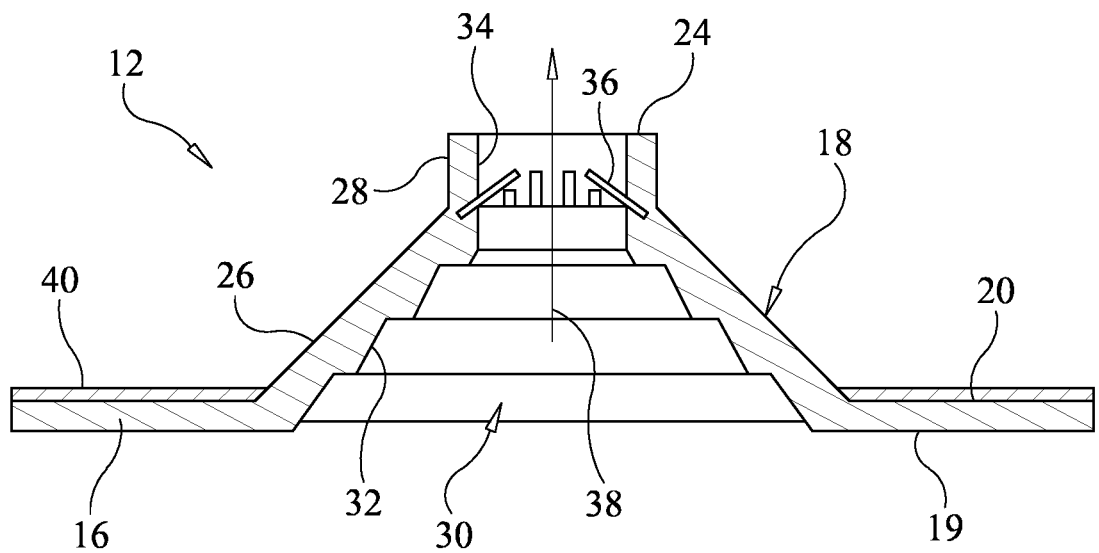
FIG. 4 is a cross-sectional view taken along line 4-4 in FIG. 2.

With reference to the drawings in which like reference characters designate like or corresponding parts throughout the various views, and with reference to FIGS. 1-4, an insect egress device constructed in accordance with an embodiment of the present invention is indicated generally at 10. The insect egress device 10 is for use with window or door screens and is configured to attract insects, flying or crawling, and encourage the insects to move through the device and escape a room from the inside to the outside.

As shown, the insect egress device 10 includes a portal 12 and a retainer 14. The portal 12 is configured to be attached to an interior side of a window screen and extend through an opening formed in the screen. The retainer 14 is configured to be attached to an exterior side of the window screen, opposite from the portal 12, and further secure the portal to the screen. The retainer 14 strengthens the bond to the screen and allows the device to function while experiencing a range of dynamic loads, such as: installation into a R.V. camper trailer, camping tents, wall tents, portable toilets, etc.

The portal 12 and the retainer 14 are each preferably constructed of a rigid, plastic material with UV resistance properties to protect against damage from exposure to sun light. Further, being constructed of plastic, rather than metal, thus preventing corrosion and the possibility of damage to the screen and surrounding structure from rust stains. In embodiments, the portal 12 may be constructed of black PETG plastic.

As shown, the portal 12 includes flange 16 and an extension 18 formed integral with the flange and extending outwardly from the flange at a central location therefrom such that the flange completely extends around the extension. The flange 16 is generally planar shaped with a low-profile or thin cross-section and opposite broad surfaces 19 and 20. The low-profile configuration allows insects to easily move from the surrounding screen onto the outwardly facing surface 18 without getting trapped between the flange 16 and the screen to which the portal 12 is secured.

The flange 16 can have a decoratively shaped profile and/or a decorative design applied to surface 19. As representatively shown, the flange 16 is shaped to look like a flower. However, the flange 16 could be provided with any decorative shape as desired and is in no way limited to the representatively illustrated flower shape. Simulated water droplets 22 can be provided on surface 19 to further attract insects to the device 10. Simulated water droplets act as a hydration point for insects and encourage further attraction to device. House flies and many other insects are nonaquatic and are afraid of large bodies of water. Small beads of water are an ideal source of water for most insects.

Flies and other insects have compound vision. Due to this aspect, they cannot focus well but are attracted to a range of colors, some more than others. In embodiments, a decorative design applied to surface 19 of the flange 16 may convey many hues and bright attractive colors arranged in an artistic pattern to be aesthetically pleasing to humans and provide chromatic attraction for insects.

The extension 18 extends from the flange 16 and terminates at a free, unattached end 24, which has a generally flat, planar surface arranged parallel to the flange. The extension 18 has an exterior surface having a first section 26 and a second section 28. The first section 26 is frusto-pyramidal shaped and tapers from wide to narrow in a direction outwardly from the flange 16 toward the second section 28. The first section 26, at its narrow end, transitions into the second section 28, which is generally square shaped and includes the free end 24.

Portal 12 further includes an egress passage 30 extending through the flange 16 and completely through the extension 18, thereby providing a path for an insect to traverse through the portal from the surface 18 of the flange to the free end 24 and out of the portal. Further, light entering the passage 30 from end 24 further attracts insects into the passage and encourages the insects to traverse the passage and exit passage to the outside. Further, the daylight visible at the end of the passage 30 entering from end 24 further attracts airborne bugs by providing an adequately sized hole illuminated by daylight at the midpoint of a darker mass, enticing flies or insects directly outward through device without contacting the screen.

A first section 32 of the sidewall of the egress passage 30 includes a tapering stair-step configuration that tapers from wide to narrow in a direction away from the flange and toward end 24. The first section 32 transitions into a second section 34 of the sidewall that is not stair-step and is generally straight and terminates at the free end 24.

The stair-stepped first section 32 of the egress passage sidewall can be covered, coated, or otherwise provided with a phosphorescent material to attract and encourage insects to enter the egress passage 30 at night or in low light conditions. The stair-stepped configured increases surface glow provided by the phosphorescent material, that otherwise would not be provided with a straight, conical, or tapered configuration.

The portal 12 may further have a plurality of bristles 36 disposed at or near the transition between the first and second egress passage sidewall sections 32 and 34 and arranged around the passage 30 in a generally inwardly angled configuration toward end 24. In this manner, the bristles 36 are angled from wide to narrow in the direction 38 toward end 24. The bristles 36 act to prevent outside insects from entering the passage from end 24 and allow inside insects to traverse through the passage from the flange end and out of end 24. The bristles 36 are configured to be flexible and the angled arrangement provide little resistance to insects traversing outwardly in direction 38 through the passage 30.

Preferably, the bristles 36 are constructed of low visibility material to not deter insects from passing through the bristles. Being constructed of low visibility material and occupying minimal surface area, only a small amount of light will be obstructed from entering through end 24 into the passage, thus encouraging more day light contrast with device and in turn the likelihood of insects exiting to the outside is enhanced. The center and corner portions of the bristle pattern is left void of bristles to allow room for the head, body, and wings of insect.

It is important to note the flat horizontal surface of end 24 draws insects outward by providing a ledge for insects to grasp with their front appendages and easily pull themselves through. This flat surface area also acts a takeoff area for insects. It increases the likelihood of insects exiting through the device by providing visual assurance that they can position themselves safely on the outer-most portion of the device to begin their outward flight. It also helps to protect bristles from damage.

Further, the length of section 28 of the extension 18 is selected to minimize the likelihood of outdoor insects making visual contact with the phosphorescent glow provided on the stair-stepped section 32 of the egress passage 30 and discourage insect congregation around the entry point through end 24. Further, in embodiments, the length of section 26 of the extension 18 is designed to afford clearance for most double door enclosures (i.e., screen door/main door combinations).

The portal 12 is further provided with a pressure-sensitive adhesive 40 on surface 20 to allow the portal to be secured to a window screen with the extension 18 extending through a hole in the screen.

In embodiments, at least the exterior surface of the extension 18 is colored black by either painting or coating, or by pigmentation of the plastic from which the portal 12 is constructed. The black coloring promotes thermal energy absorption when exposed to sunlight. The energy absorbed will be transmitted into radiant heat and will be detected by inside insects, thus encouraging further attraction.

The retainer 14 is generally planar and flat and has a thin profile with opposite broad surfaces 42 and 44. An aperture 46 is provided through the surfaces 42 and 44 and is sized to allow the extension 18 of the portal 12 to extend through the aperture 46 to sandwich a window screen between the retainer and the flange 16 of the portal. Pressure sensitive adhesive 48 is provided on surface 44 to allow the retainer 14 to be secured to a window screen with the portal extension 18 extending through a hole in the screen and through aperture 46.

Figure 5:
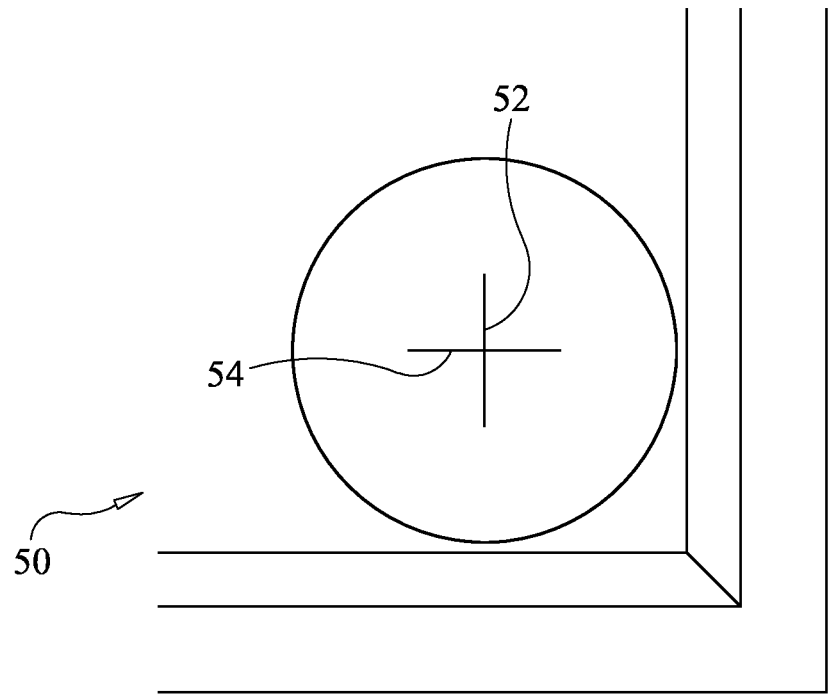
FIG. 5 is a diagrammatic view of a window screen, shown how cuts are made in the screen to install an insect egress device in accordance with the principles of at least one embodiment of the invention.

With reference to FIG. 5, installing the egress device 10 is simple and will be described herein. Installation includes first a user determining where on a window screen 50 the user desires the egress device to be located. Next, an opening is made in the screen 50 by making one vertical slit 52 and one horizontal slit 54 through the screen in a cross pattern, as shown.

Figure 7:
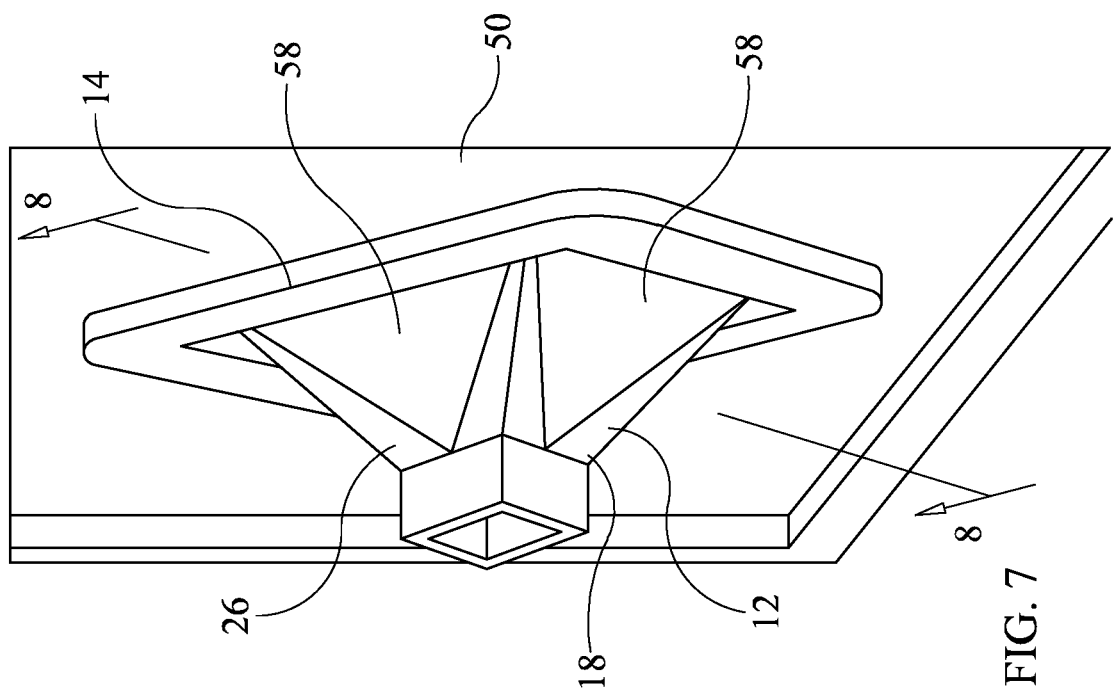
FIG. 7 is a diagrammatic, perspective view of an insect egress device installed in a window screen in accordance with the principles of at least one embodiment of the invention.
Figure 6:
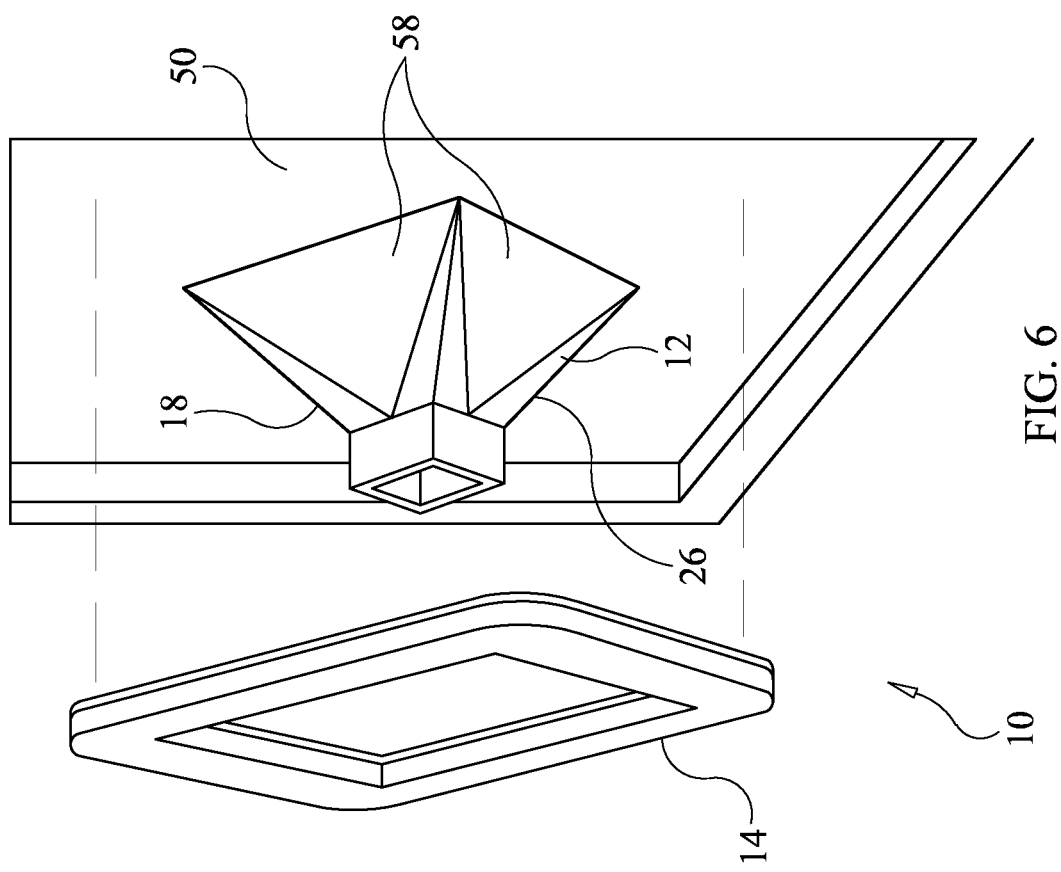
FIG. 6 is a diagrammatic, exploded perspective view of an insect egress device being installed in a window screen in accordance with the principles of at least one embodiment of the invention.
Figure 8:
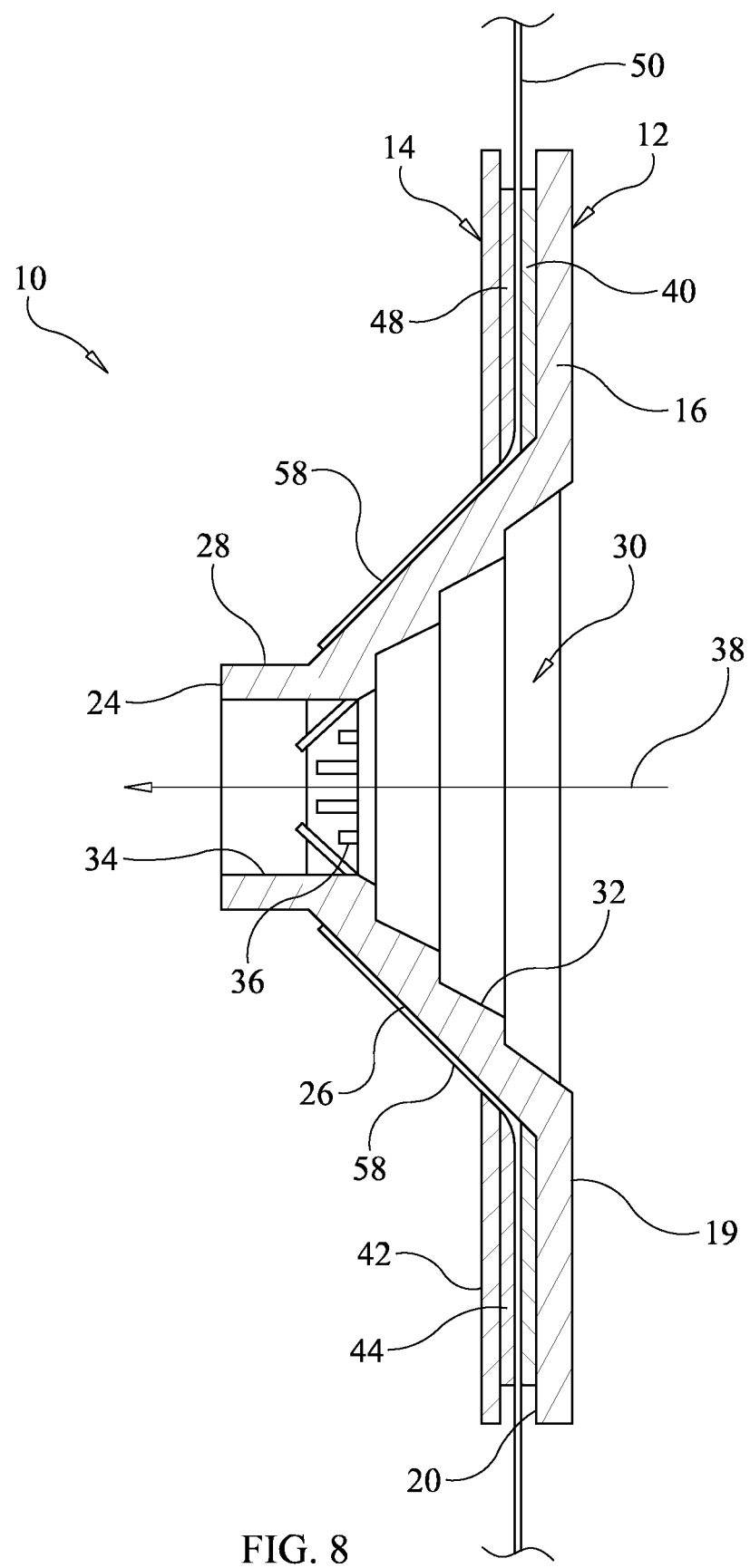
FIG. 8 is a cross-sectional view taken along line 8-8 in FIG. 7.

With reference to FIGS. 6-8, the portal 12 is attached to the screen 50 by inserting the portal extension 18 through the opening formed in the screen by aligning the vertices of the frusto-pyramidal section 26 of the extension with the slits 52 and 54 to position the portal flange 16 against the inside surface 56 of the window screen. In this manner, the triangular sections 58 created in the screen 50 by slits 52 and 54 rest on the exterior surface of the extension, one on each side of the pyramidal shaped, as best seen in FIG. 6. The portal flange 16 is pressed against the screen to adhere the flange to the screen by the pressure-sensitive adhesive 40.

Next, the retainer 14 is installed on the opposite, exterior side of the screen 50 with the portal extension 18 disposed through aperture 46. The retainer 14 is pressed against the outside surface 60, securing the retainer to the screen by pressure-sensitive adhesive 48. Pressure-sensitive adhesive 48 on the retainer 14 may also contact the pressure-sensitive adhesive 40 on the portal through the screen mesh, thereby further securing the egress device to the screen.

Once installed, inside insects, flying or otherwise, are attracted to the egress device 10 by one or more of the various attracting features of the device discussed above. Once attracted to the device, insects can travel through the portal passage 30 and out of the portal through open end 24.

While the invention has been particularly shown and described with respect to the illustrated embodiments thereof, it will be understood by those skilled in the art that the foregoing and other changes in form and details may be made therein without departing from the spirit and scope of the invention.

What is claimed is:

1. An egress device for use with a screened opening to permit insects trapped inside to escape through the egress device to the outdoors, the egress device comprising:
    a portal, the portal having a planar flange with opposite first and second broad flange surfaces, an extension extending outwardly from the second broad flange surface and terminating at a free end, and an egress passage extending completely through the flange and the extension;
    the extension having first and second extension sections, the first extension section being frusto-pyramidal shaped and tapering from wide to narrow in a direction outwardly from the second broad flange surface toward the second extension section, the first extension section, at its narrow end, transitions into the second extension section which includes the free end; and
    the egress passage having first and second sidewall sections, the first sidewall section having a tapering stair-step configuration that tapers from wide to narrow in a direction away from the second broad flange surface and the free end, the first sidewall section transitions into the second sidewall section that is not stair-step and is generally straight and terminates at the free end.

2. The egress device of claim 1, further comprising a pressure-sensitive adhesive on the second broad flange surface.

3. The egress device of claim 1, further comprising a phosphorescent material disposed on the first sidewall section and visible through the egress passage from an interior position located on the first broad flange surface side of the portal.

4. The egress device of claim 1, further comprising a retainer having opposite first and second broad retainer surfaces and an aperture extending therethrough, the aperture sized such that the extension can be passed therethrough and dispose the second broad retainer surface adjacent to the second broad flange surface.

5. The egress device of claim 4, further comprising a pressure-sensitive adhesive on the second broad retainer surface.

6. The egress device of claim 1, further comprising bristles disposed in the egress passage and around the passage and approximate the transition from the first sidewall section and the second sidewall section, and wherein the bristles are tapered inwardly into the egress passage in and in a direction toward the free end so as to allow passage of an insect through the bristles in a direction from the flange toward the free end and prevent the passage of an insect in the opposite direction.

7. The egress device of claim 6, wherein the bristles are comprised of a low-visibility material.

8. The egress device of claim 1, further comprising a decorative pattern disposed on the first broad flange surface.

9. The egress device of claim 8, wherein the decorative pattern includes simulated water droplets.

10. The egress device of claim 1, wherein at least the extension is colored in a dark color to absorb thermal energy from sunlight and to be heated by the absorbed thermal energy.

11. An egress device for use on a screened opening to permit insects trapped inside to escape through the egress device to the outdoors, the egress device comprising:
    a portal, the portal having a planar flange with opposite first and second broad flange surfaces, an extension extending outwardly from the second broad flange surface and terminating at a free end, and an egress passage extending completely through the flange and the extension;
    first pressure-sensitive adhesive disposed on the second broad flange surface;
    the extension having first and second extension sections, the first extension section being frusto-pyramidal shaped and tapering from wide to narrow in a direction outwardly from the second broad flange surface toward the second extension section, the first extension section, at its narrow end, transitions into the second extension section which includes the free end;
    the egress passage having first and second sidewall sections, the first sidewall section having a tapering stair-step configuration that tapers from wide to narrow in a direction away from the second broad flange surface and the free end, the first sidewall section transitions into the second sidewall section that is not stair-step and is generally straight and terminates at the free end;
    a retainer having opposite first and second broad retainer surfaces and an aperture extending therethrough, the aperture sized such that the extension can be passed therethrough and dispose the second broad retainer surface adjacent the second broad flange surface; and
    second pressure-sensitive adhesive disposed on the second broad retainer surface.

12. The egress device of claim 11, further comprising a phosphorescent material disposed on the first sidewall section and visible through the egress passage from an interior position located on the first broad flange surface side of the portal.

13. The egress device of claim 11, further comprising bristles disposed in the egress passage and around the passage and approximate the transition from the first sidewall section and the second sidewall section, and wherein the bristles are tapered inwardly into the egress passage in and in a direction toward the free end so as to allow passage of an insect through the bristles in a direction from the flange toward the free end and prevent the passage of an insect in the opposite direction.

14. The egress device of claim 13, wherein the bristles are comprised of a low-visibility material.

15. The egress device of claim 11, further comprising a decorative pattern disposed on the first broad flange surface.

16. The egress device of claim 15, wherein the decorative pattern includes simulated water droplets.

17. The egress device of claim 11, wherein at least the extension is colored in a dark color to absorb thermal energy from sunlight and to be heated by the absorbed thermal energy.

18. An egress device for use on a screened opening to permit insects trapped inside to escape through the egress device to the outdoors, the egress device comprising:
    a portal, the portal having a planar flange with opposite first and second broad flange surfaces, an extension extending outwardly from the second broad flange surface and terminating at a free end, and an egress passage extending completely through the flange and the extension;
    first pressure-sensitive adhesive disposed on the second broad flange surface;
    the extension having first and second extension sections, the first extension section being frusto-pyramidal shaped and tapering from wide to narrow in a direction outwardly from the second broad flange surface toward the second extension section, the first extension section, at its narrow end, transitions into the second extension section which includes the free end;

the egress passage having first and second sidewall sections, the first sidewall section having a tapering stair-step configuration that tapers from wide to narrow in a direction away from the second broad flange surface and the free end, the first sidewall section transitions into the second sidewall section that is not stair-step and is generally straight and terminates at the free end;

a retainer having opposite first and second broad retainer surfaces and an aperture extending therethrough, the aperture sized such that the extension can be passed therethrough and dispose the second broad retainer surface adjacent the second broad flange surface;

second pressure-sensitive adhesive disposed on the second broad retainer surface;

a phosphorescent material disposed on the first sidewall section and visible through the egress passage from an interior position located on the first broad flange surface side of the portal; and bristles disposed in the egress passage and around the passage and approximate the transition from the first sidewall section and the second sidewall section, and wherein the bristles are tapered inwardly into the egress passage in and in a direction toward the free end so as to allow passage of an insect through the bristles in a direction from the flange toward the free end and prevent the passage of an insect in the opposite direction.

19. The egress device of claim 18, further comprising a decorative pattern disposed on the first broad flange surface, and wherein the decorative pattern includes simulated water droplets.

20. The egress device of claim 18, wherein at least the extension is colored in a dark color to absorb thermal energy from sunlight and to be heated by the absorbed thermal energy.

* * * * *